(12) United States Patent
Blount et al.

(10) Patent No.: US 8,783,371 B2
(45) Date of Patent: Jul. 22, 2014

(54) SUBSURFACE CAPTURE OF CARBON DIOXIDE

(76) Inventors: Gerald Blount, North Augusta, SC (US); Alvin A. Siddal, Aiken, SC (US); Ronald W. Falta, Seneca, SC (US)

( * ) Notice: Subject to any disclaimer, the term of this patent is extended or adjusted under 35 U.S.C. 154(b) by 331 days.

(21) Appl. No.: 12/655,789

(22) Filed: Jan. 7, 2010

(65) Prior Publication Data
US 2010/0170674 A1 Jul. 8, 2010

Related U.S. Application Data

(60) Provisional application No. 61/143,232, filed on Jan. 8, 2009.

(51) Int. Cl.
*E21B 43/34* (2006.01)

(52) U.S. Cl.
USPC .............................. 166/402; 166/372; 166/267

(58) Field of Classification Search
None
See application file for complete search history.

(56) References Cited

U.S. PATENT DOCUMENTS

| | | | | |
|---|---|---|---|---|
| 3,780,805 | A * | 12/1973 | Green | 166/266 |
| 3,871,451 | A * | 3/1975 | Brown | 166/267 |
| 4,187,910 | A * | 2/1980 | Cornelius et al. | 166/305.1 |
| 4,212,354 | A | 7/1980 | Guinn | |
| 4,250,962 | A * | 2/1981 | Madgavkar et al. | 166/256 |
| 4,593,763 | A | 6/1986 | Burke | |
| 4,762,178 | A * | 8/1988 | Falls et al. | 166/268 |
| 5,439,054 | A * | 8/1995 | Chaback et al. | 166/252.1 |
| 6,767,471 | B2 * | 7/2004 | Max | 210/702 |
| 6,808,693 | B2 * | 10/2004 | Arnaud et al. | 423/212 |
| RE39,077 | E | 4/2006 | Eaton | |
| 2003/0047309 | A1 * | 3/2003 | Thomas et al. | 166/265 |
| 2007/0261844 | A1 * | 11/2007 | Cogliandro et al. | 166/248 |

FOREIGN PATENT DOCUMENTS

| | | |
|---|---|---|
| EP | 2 058 471 A1 | 5/2009 |
| WO | WO2007133461 A2 | 11/2007 |

OTHER PUBLICATIONS

McMillian Burton and Steven L. Bryant; *Surface disssolution: minimizing groundwater impact and leakage risk simultaneously*; Energy Procedia 08. GHGT-9; The Univertsity of Texas at Austin; Austin, TX; 9 pages.

Grant J. Duncan and Catherine A. Hartford; *Design, operation of acid gas injection/dispostal wells*; World Oil, Oct. 1998.

* cited by examiner

*Primary Examiner* — Angela M DiTrani
*Assistant Examiner* — Silvana Runyan
(74) *Attorney, Agent, or Firm* — Dority & Manning, PA

(57) ABSTRACT

A process and apparatus of separating $CO_2$ gas from industrial off-gas source in which the $CO_2$ containing off-gas is introduced deep within an injection well. The $CO_2$ gases are dissolved in the, liquid within the injection well while non-$CO_2$ gases, typically being insoluble in water or brine, are returned to the surface. Once the $CO_2$ saturated liquid is present within the injection well, the injection well may be used for long-term geologic storage of $CO_2$ or the $CO_2$ saturated liquid can be returned to the surface for capturing a purified $CO_2$ gas.

11 Claims, 2 Drawing Sheets

SUBSURFACE CAPTURE OF CARBON DIOXIDE

RELATED APPLICATION

This application claims the benefit of U.S. Application Ser. No. 61/143,232 filed Jan. 8, 2009 and is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed to an apparatus and a process for the capture of carbon dioxide ($CO_2$) gases in subsurface hydrostatic conditions. The present invention is further directed towards long-term storage of $CO_2$ gases in aquifers and reservoirs that do not require a cap lock/seal, geologic trap, or use of supercritical $CO_2$ pressures.

BACKGROUND OF THE INVENTION

It is known in the art to use supercritical $CO_2$ conditions to trap and store $CO_2$ gases. Because of the unique requirements of supercritical $CO_2$, below ground storage of $CO_2$ has heretofore required safety traps and adequate geologic cap lock/seals which has largely restricted suitable reservoirs to oil and gas fields. The number of available oil and gas fields and their capacity are but a few of the limitations which prevent more widespread use of supercritical $CO_2$ storage.

Alternatively, it has been proposed to use above ground processing of brine by dissolving the $CO_2$ in a surface facility prior to injection of the saturated brine into the groundwater. One such methodology is described in the publication *Surface Dissolution: Minimizing Groundwater Impact and Leakage Risk Simultaneously* as published in *Energy Procedia* in 2008 authored by MacMillan Burton and Steven Bryant. However, the methodology proposed by Burton and Bryant is very capital and energy intensive in that above-ground treatment and pressurization of the brine and $CO_2$ gases is required and relies upon numerous injection wells.

Accordingly, there remains room for variation and improvement within the art.

SUMMARY OF THE INVENTION

It is one aspect of at least one of the present embodiments to provide for an apparatus and process in which an injection well is used to dissolve carbon dioxide gases into water. The dissolution of $CO_2$ gases into water within an injection well may be used with a $CO_2$ capture process. Optionally, the process may be further utilized to provide long-term geologic storage of $CO_2$ under non-critical pressure conditions within an aquifer.

It is a further aspect of at least one of the present embodiments to use counterflow bubble columns in an injection well to saturate water with $CO_2$ gas prior to releasing $CO_2$ saturated water from the injection well.

It is a further aspect of at least one of the present embodiments to provide for an injection well which is in communication with a source of $CO_2$ containing gases of an industrial waste stream. The waste stream gases are transported below ground to one or more saturation modules within the injection well. As the $CO_2$ gases are dissolved in the water, the undissolved non-$CO_2$ gases are returned to the surface for conventional treatment. The $CO_2$ saturated water is then injected into the subsurface aquifer.

It is yet a further aspect of at least one of the present embodiments to provide a process and apparatus in which $CO_2$ gases can be stripped from industrial flue gases, the $CO_2$ gases being used to saturate water while within a portion of an injection well. Following saturation, the $CO_2$ saturated water or brine solution is released into the groundwater where the greater density of the $CO_2$ saturated water helps maintain a continuous gradient flow of $CO_2$ saturated water away from the injection point of the well.

It is yet a further aspect of at least one of the present embodiments to provide a process and apparatus in which the water column pressure associated with a well is used to capture and/or provide for storage of $CO_2$ gas dissolved in the water. The water pressure provided by the well head water column greatly facilitates the $CO_2$ separation and $CO_2$ storage energy needs by using the well head pressure to maintain the $CO_2$ gas concentrations within the saturated injection well water.

It is a further aspect of at least one of the present embodiments to provide a process and apparatus in which a well may be utilized to capture $CO_2$ gases, within the water or brine by saturation, which will release the $CO_2$ when the water or brine is returned to a lower pressure condition.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

In accordance with the present invention, an injection well may be used to dissolve $CO_2$ into a water source. As seen in reference to FIGS. 1 and 2, the water source may be derived from a remote extraction well field.

$CO_2$ is known to have high solubility in water. At higher hydrostatic pressures, the solubility of $CO_2$ is increased to approximately 50 gms $CO_2$/kg of water at depths of around 2,000 feet below an aquifer's surface. When saturated water or brine is placed in a subsurface environment, the greater density which is attributable to the dissolved $CO_2$ makes the water negatively buoyant and it will subsequently migrate in a downward direction. As a result, the necessity of a suitable cap lock/seal or geologic trap is not needed in order to contain the dissolved $CO_2$ gas. As a result, the geologic storage of $CO_2$ using the process and apparatus described herein opens up a much larger number and variety of aquifers which are suitable for storage of $CO_2$ saturated water or brine. Under the conditions described herein, the injection well pressure can be utilized to store $CO_2$ in a sub-surface environment in aqueous concentrations of about 6% by mass.

Figure 1:
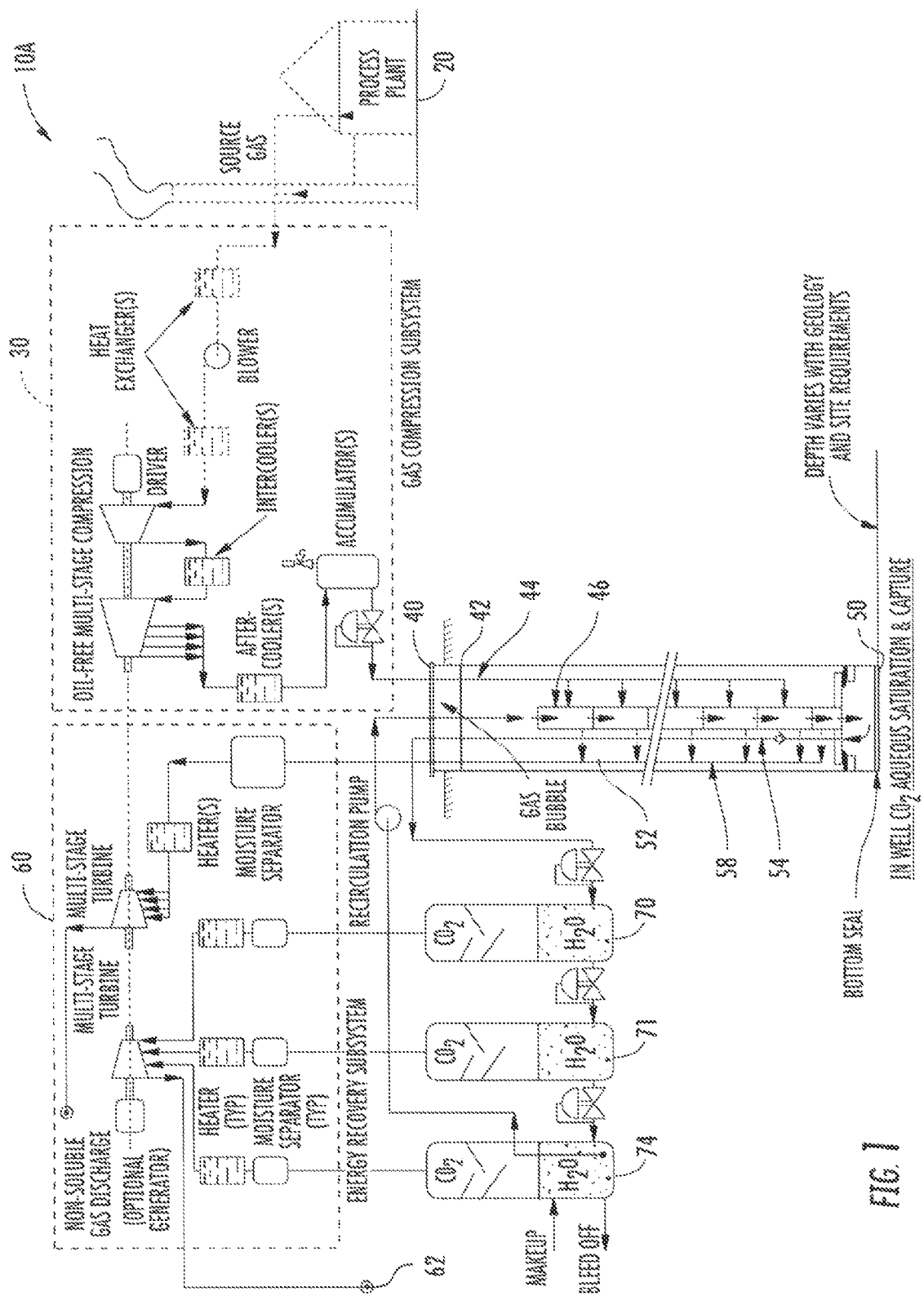
FIG. 1 is a schematic view of a $CO_2$ capture process and apparatus using an injection well.

Set forth in FIG. 1 is a schematic diagram directed to an overall process 10a using an injection well to saturate water with $CO_2$ for a $CO_2$ capture process. As seen in reference to FIG. 1, an industrial process 20 is illustrated that is associated with a $CO_2$ discharge. The $CO_2$ discharge may be from a variety of manufacturing and refining processes which generate high volumes of $CO_2$.

The $CO_2$ enriched industrial source gas is collected and processed within a gas compression subsystem 30 in which the $CO_2$ rich source gas is cooled as needed and compressed. From the subsystem 30, the $CO_2$ enriched gas is introduced into a well head 40. Well head 40 has a controlled water level 42 through which the $CO_2$ flows along supply line 44 and branches off at multiple locations into a multi-stage process modules 46, each module including absorption and gas separation units. Non-$CO_2$ gases within the source gas are much less soluble in water and will be separately returned to the surface where they may be treated or separated by other conventional techniques or apparatuses.

As the water/brine solutions becomes saturated with $CO_2$, a return line 54 is used to remove the $CO_2$ saturated water where it is pumped through a series of gas separators as seen in a high pressure gas separator 70, mid-pressure gas separator 71 and low-pressure gas separator 74. The recovered $CO_2$ from the gas separators may be directed to an energy recovery subsystem 60 where moisture is removed and purified $CO_2$ gas is collected as reflected by a collection outlet 62. The energy recovery subsystem 60 also utilizes non-soluble gas from the gas separation units within modules 46 as seen by gas return lines 58. The non-soluble gases are directed to energy recovery sub-system 60 where the non-soluble gas is processed and may ultimately be discharged.

The process as set forth in FIG. 1 takes advantage of the gravity induced pressure well head such that discharged water or brine solution becomes saturated with $CO_2$ gas at the hydrostatic pressure at the bottom of seal 50, and is then redirected towards the surface for depressurization and off-gassing of the $CO_2$. For adequate saturation of gas within the well, it is desirable to have a well depth of at least about 2000 feet, though the actual depth of the well may vary with area geology.

Figure 2:
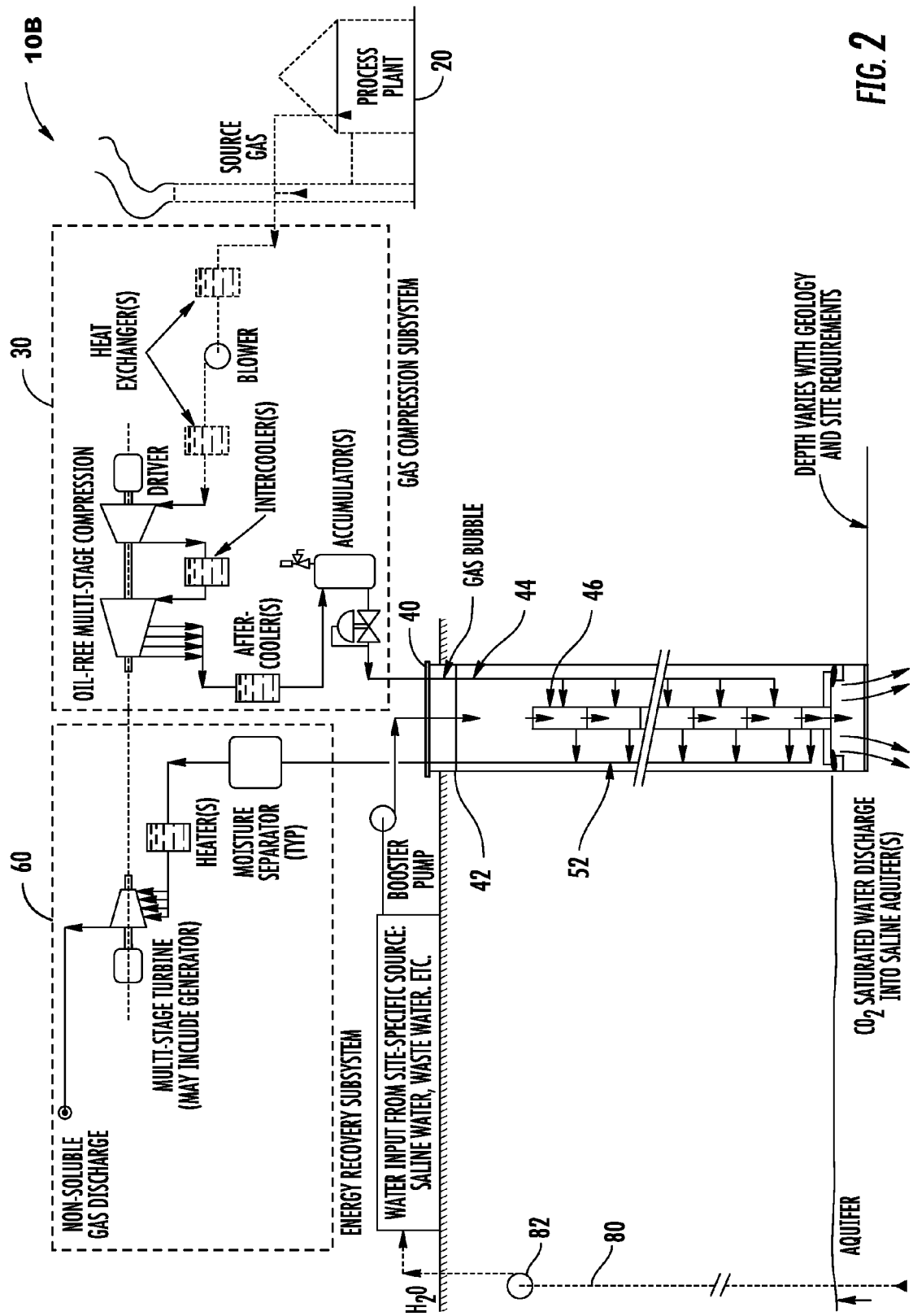
FIG. 2 is a schematic view of a $CO_2$ capture process and apparatus including geological storage of $CO_2$ under non-critical conditions.

As seen in reference to FIG. 2, a schematic diagram and supporting apparatuses are seen in reference to a process 10b of capturing and storing geologically $CO_2$.

As seen in reference to FIG. 2, an industrial process 20, which generates $CO_2$ discharges has the $CO_2$ source gas collected and transferred to a gas compression subsystem 30. The gas compression subsystem 30 is used to accumulate a $CO_2$ rich gas which is then supplied under pressure to the bottom of a well 40. The compressed source gas is introduced into the well along a supply line 44 where the $CO_2$ gas enters a series of modules 46 which are used to absorb non-$CO_2$ and to further separate out the non-$CO_2$ gases from the source gas constituents. The gas, in the form of a $CO_2$ saturated liquid, exits the multi-absorption and separation units and is introduced into a discharge region of the well. A return line 52 is used to transport non-soluble gases to an energy-recovery subsystem 60 for processing and discharge of non-soluble gases.

As further seen in FIG. 2, a withdraw well 80 may be utilized with pump 82 to provide a water source for maintaining the water level within well head of well 40. As seen, additional water input may be from other site specific sources and may include saline water, waste water or other dischargeable water/brine sources which may be discharged into the aquifer. As further seen in reference to both FIG. 1 and FIG. 2, appropriate support rings and packing material 56 may be provided to eliminate contamination of the well.

As seen in reference to FIGS. 1 and 2, a water level 42 is maintained within the structural well 40. The mass of the water column within the well helps maintain the high pressure conditions to facilitate discharge of the saturated accumulation of $CO_2$ within the bottom of the well. As seen in reference to FIG. 1, the $CO_2$ saturated liquid such as water/brine may be returned to the surface for processing and $CO_2$ capture or, as described in reference to FIG. 2, may be discharged into the associated aquifer.

As set forth in FIGS. 1 and 2, the injection well may employ a gas cushion for water/gas separation and recycling. The saturation module(s) within the well uses a counterflow bubble column that may be configured for desired length and saturation levels depending upon flow rate and the nature of the source gas. Use of counterflow bubble columns for gas saturation is well known within the art. As further seen in FIGS. 1 and 2, a conventional free gas separator is provided to separate gaseous (undissolved) remove $CO_2$ and other gas bubbles prior to injection.

The excess gas which is captured in the separator may be introduced into the gas cushion for recycle. As illustrated, well packers may be used to create a seal between the well casing and the injection well components.

As seen in FIGS. 1 and 2, the water level within the injection well may be controlled by the injection rate of water from an extraction well, the permeability of the receiving aquifer, as well as the injection rate of gas into the saturation modules. The interaction of these various parameters controls the free gas capture rate as well as the release of gas from the gas cushion or recycle or venting to the atmosphere.

The gas cushion illustrated in the injection well functions as an "in well" gas/water separator. The water level at the base of the gas cushion can also be controlled by the rate of water injection, the rate of gas injection, and the amount of recycle/venting of gas from the gas cushions.

The apparatus and process described above is well suited for capturing of $CO_2$ gases from flue gases and other industrial sources. $CO_2$ has a solubility in water which is dozens of times greater than the non-water vapor components of conventional flue gases. For industries such as cement manufacturing, burnt lime production, and coal fired utility plants, the flue gases are rich in $CO_2$. While other flue gas components may be dissolved into the water, such dissolution of non-$CO_2$ gases is at extremely low concentrations and is miniscule compared to the relative saturation amount of $CO_2$ in the water/brine.

The presence of dissolved $CO_2$ in the water and/or brine solution is mildly acidic which helps prevent the formation of scale on the processing equipment. Further, once injected into the subsurface, the $CO_2$ contained within the water will have a tendency to mineralize into mineral carbonates. The formation of carbonates will extend the capacity of the aquifer for storage of $CO_2$ and also provides for a very durable component of a stored $CO_2$ product.

As seen in reference to FIGS. 1 and 2, the operation of the injection well can be remote from the source of the $CO_2$ containing industrial gas. Likewise, as is well known to one having ordinary skill in the art, the operation of an extraction well and related injection well may create the necessary subsurface directional flow and beneficial pressures to facilitate the introduction of the saturated $CO_2$ water/brine into the subsurface region. As the more dense water saturated with $CO_2$ will migrate in a downward direction, the injection well can operate for extended periods of time as the introduced material migrates away from the injection point.

An advantage of the present process over the surface pressurization of both water and gases is that the present process uses gravity to provide the hydrostatic pressurization of the water. The source gases are then injected at various depths in at corresponding pressures to optimize the energy required for the compression process. Further energy savings are realized through the use of the described ancillary above-ground subsystems, such as compression, heat transfer and energy recovery, which further optimize energy use and recovery to make the process more economically viable.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A process of separating carbon dioxide from a waste gas comprising the steps of:

transporting said waste gas from above ground to a saturation module below ground, the saturation module being within a well, the waste gas comprising carbon dioxide and non-carbon dioxide gases, the waste the to the saturation module via a supply line:

transporting a liquid within the well, the liquid flowing downward below ground and within the well;

introducing said waste gas from the supply line into the liquid contained within said well at the saturation module, the carbon dioxide dissolving into the liquid following the introduction and the liquid becoming saturated with the carbon dioxide within the well, the non-carbon dioxide gases substantially insoluble in said liquid;

returning the non-carbon dioxide gases to above-ground via a first return line from the saturation module; and removing the liquid that has been saturated with the carbon dioxide from the well.

2. The process according to claim 1, further comprising supplying the waste gas to the well from an industrial source.

3. The process according to claim 1, wherein said well is about 2,000 feet below ground surface.

4. The process according to claim 1, wherein the process utilizes more than one saturation module.

5. The process according to claim 1, wherein the liquid is water or brine.

6. The process according to claim 1, wherein the liquid that has been saturated with the carbon dioxide is removed from the well to above-ground via a second return line.

7. The process according to claim 6, further comprising capturing the carbon dioxide that saturated the liquid, the carbon dioxide that is captured being substantially free of the non-carbon dioxide gases.

8. the process according to claim 7, further comprising returning the liquid to the well in a recirculation loop.

9. The process according to claim 1, further comprising directing the non-carbon dioxide to an energy recovery subsystem.

10. The process according to claim 1, further comprising compressing the waste gas prior to transporting the waste gas to the saturation module within the well.

11. The process according to claim 1, wherein the saturation module comprises a counter-flow bubble column.

\* \* \* \* \*

UNITED STATES PATENT AND TRADEMARK OFFICE
CERTIFICATE OF CORRECTION

| | | |
|---|---|---|
| PATENT NO. | : 8,783,371 B2 | Page 1 of 1 |
| APPLICATION NO. | : 12/655789 | |
| DATED | : July 22, 2014 | |
| INVENTOR(S) | : Gerald Blount et al. | |

It is certified that error appears in the above-identified patent and that said Letters Patent is hereby corrected as shown below:

In the Claims

-- Claim 1, column 6, lines 10-11 -- please correct "...the waste the to the saturation module via a supply line;" to read as follows -- "...the waste gas being transported to the saturation module via a supply line;"

Signed and Sealed this
Twenty-eighth Day of October, 2014

Michelle K. Lee
*Deputy Director of the United States Patent and Trademark Office*